W. G. HALL.
FRUIT JAR SEALER.
APPLICATION FILED MAY 12, 1909.
957,952.
Patented May 17, 1910.
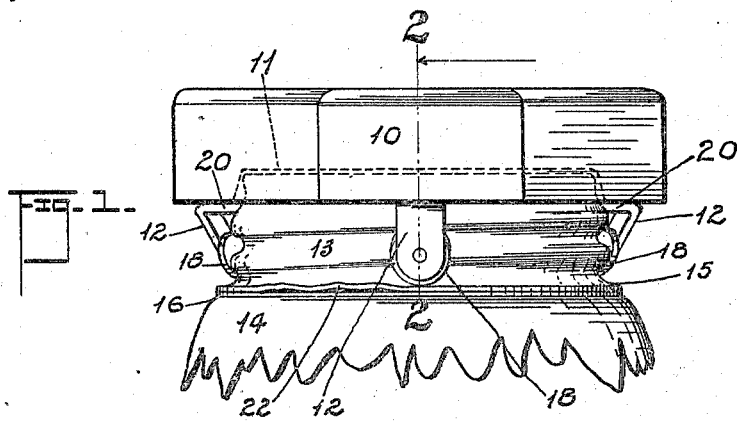
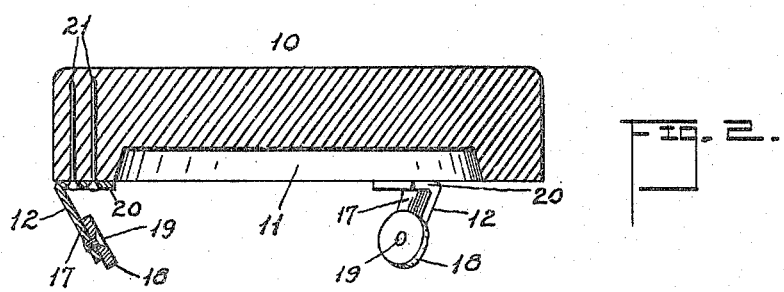
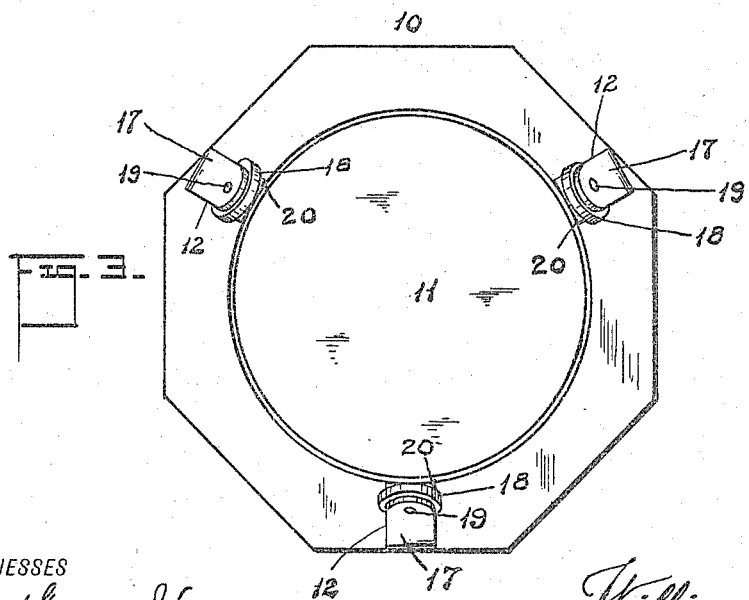
WITNESSES
Frederick Germain Jr
Frances E. Blodgett.
INVENTOR
William G. Hall,
BY
Russell M. Everett,
ATTORNEY.

UNITED STATES PATENT OFFICE.

WILLIAM G. HALL, OF IRVINGTON, NEW JERSEY.

FRUIT-JAR SEALER.

957,952. Specification of Letters Patent. Patented May 17, 1910.

Application filed May 12, 1909. Serial No. 495,395.

*To all whom it may concern:*

Be it known that I, WILLIAM G. HALL, a citizen of the United States, residing at Irvington, in the county of Essex and State of New Jersey, have invented certain Improvements in Fruit-Jar Sealers, of which the following is a specification.

This invention relates to the impervious sealing of glass jars in canning fruit as is commonly done by housewives, and more particularly to the securing of an impervious joint between the metal cover and glass body of the jar. In glass jars or cans of this sort, such as the well known Mason fruit jar, the metal cover has a narrow flange or skirt at its edge which is adapted to seat upon a rubber gasket placed between said cover and the body of the jar. It will be understood that the said skirt or flange of the cover sometimes gets bent or dented, so that no amount of screwing down upon the rubber ring will make a tight joint where said dent occurs. Furthermore, the jars being made rapidly and cheaply are not sure to have a perfectly formed seat for the rubber gasket, and there is apt to be enough looseness or lack of compression between said seat and the cover at some point to cause leakage.

The objects of the present invention are to provide a convenient implement for pressing or sealing the flange of a fruit jar cover smoothly and tightly down upon its rubber ring beneath; to secure for such an implement not only a simple and inexpensive construction but one that at the same time shall be durable and effective; to thus enable every jar filled with fruit to be perfectly sealed and avoid the danger of loss by leakage; to thus facilitate the canning of fruit, and to obtain other advantages and results as may be brought out in the following description.

Referring to the accompanying drawings, in which like numerals of reference indicate corresponding parts in each of the several figures, Figure 1 is a side elevation of my improved device in position for use upon the top of a fruit can; Fig. 2 is a section of the same on line 2—2, Fig. 1, and Fig. 3 is an underneath view of the device or implement.

In said drawings, 10 indicates a wooden body portion suitably shaped to be grasped from above by the hand, and having in its under side a recess 11 to receive the top of the can cover. Preferably this recess loosely fits the top of the can cover, so as to afford an additional guide during rotation, but under some conditions it may simply afford clearance of the can top. Furthermore, the said recess 11 may vary in depth, even extending clear through the body 10, and said body may be made of metal or other material instead of wood.

Upon the under side of the body portion 10 are downwardly projecting pressure pieces 12, preferably three in number, arranged in a circle and adapted to reach downward over the sides of the cover 13 of a fruit jar 14 and engage the flange or skirt 15 thereof, which rests upon the rubber or gasket 16. Preferably these pressure pieces comprise each a stud or arm 17 with a disk 18 rotatably mounted at its lower end to reduce the friction, said disk being shown at the inner side of the arm or stud with a rivet 19 securing it thereto and allowing it to rotate. The upper end of each arm or stud is shown bent over, as at 20, to lie flat against the body portion 10, and secured thereto by nails 21, but obviously any other suitable attachment can be employed.

The pressure pieces 12 are shown herein as bent or inclined inward, so that their lower ends will engage the narrow flange or skirt 15 of the can cover with less danger of slipping off, but this may not be indispensably necessary.

In using my improved device, the cover of the fruit jar is screwed on by hand until it is tight, but no severe wrenching or straining is necessary. Then the implement hereindescribed is applied as shown in Fig. 1, and while the can is steadied in upright position on a firm support, such as a table or the like, by one hand, the other hand grasps the body portion 10 and gives it several vigorous rotary movements or twists, pressing downward at the same time. This causes the pressure pieces 12 to run around the flange or skirt 15 and press it down onto the rubber or gasket 16, smoothing out all dents or irregularities such as indicated at 22. This is done with especial ease because the metal of which the can tops or covers are made bends with considerable ease and has little elasticity. A tight fitting joint of the cover flange or skirt 15 against the rubber or gasket 16 is thus secured for the entire circumference of the can, and that notwithstanding any irregularities in either the glass body or the metal cover of the can at their meeting parts.

Various changes may be made in the detail construction of my device without affecting the spirit and scope of the invention, and I therefore do not wish to be understood as limiting myself by positive descriptive terms herein employed except as the state of the art may require.

Having thus described the invention, what I claim is—

The hereindescribed fruit jar sealer comprising a rotatable body portion adapted to fit over the top of a fruit jar and having a uniform peripheral hand-hold at its upper part, and a plurality of sealing members projecting below said body portion and spaced from one another in an annular series, substantially as set forth.

WILLIAM G. HALL.

In the presence of—
RUSSELL M. EVERETT,
FRANCES E. BLODGETT.